United States Patent [19]
Dyksterhouse

[11] 3,736,392
[45] May 29, 1973

[54] DIRECTIONAL SIGNAL APPARATUS

[76] Inventor: Robert M. Dyksterhouse, Blue Dot Farms, Rural Route 3, Charlevoix, Mich. 49720

[22] Filed: July 15, 1971

[21] Appl. No.: 162,847

Related U.S. Application Data

[63] Continuation-in-part of Ser. No. 63,838, Aug. 14, 1970.

[52] U.S. Cl. ........... 200/61.27, 200/61.34, 200/61.3, 200/166 BB
[51] Int. Cl. .............................................. H01h 3/16
[58] Field of Search .................... 200/4, 11 G, 11 K, 200/16 C, 16 D, 61.27–61.38, 166 BB, 166 BF, 166 BH, 61.11

[56] References Cited

UNITED STATES PATENTS

| | | | |
|---|---|---|---|
| 3,209,092 | 9/1965 | Vitaloni et al. | 200/61.34 |
| 3,263,033 | 7/1966 | Metzger | 200/166 BB X |
| 3,530,266 | 9/1970 | Vitaloni | 200/61.34 |
| 3,591,740 | 7/1971 | Kolster | 200/61.27 |

FOREIGN PATENTS OR APPLICATIONS

1,191,213  4/1959  France .............................. 200/61.27

*Primary Examiner*—J. R. Scott
*Attorney*—J. King Harness, Paul F. Seibold and Cyrus G. Minkler et al.

[57] ABSTRACT

A switch which is mounted on the steering column of a vehicle and may be actuated to indicate either right or left turn information, right or left lane changing information or emergency information. The switch is transferred to the lane-change or turn mode by an actuator member which moves ball contact assemblies into various contact relations thereby making electrical contact to the various lights of the vehicle. The system also includes a circuit interconnecting the various lamps on the vehicle through a flasher, the energization of the lights being controlled by the turn signal switch. In one case a standard and emergency flasher are utilized and in the other case two standard flashers are utilized and a system is provided to short one of the lamps by means of the flasher thereby giving a sequential affect to the energization of the inboard and outboard lamps. Certain preferred modifications include a five-ball and three-ball switch.

34 Claims, 16 Drawing Figures

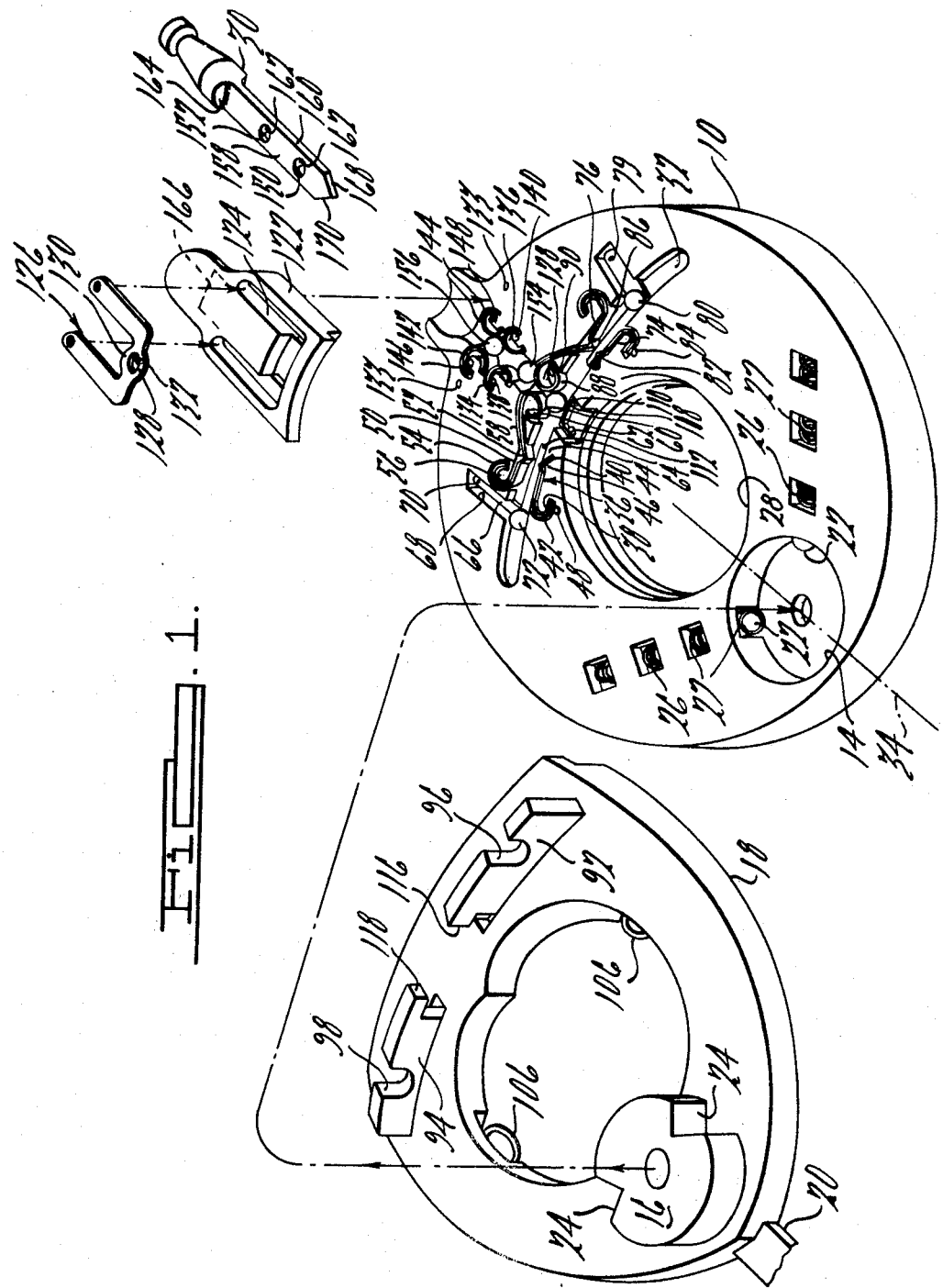

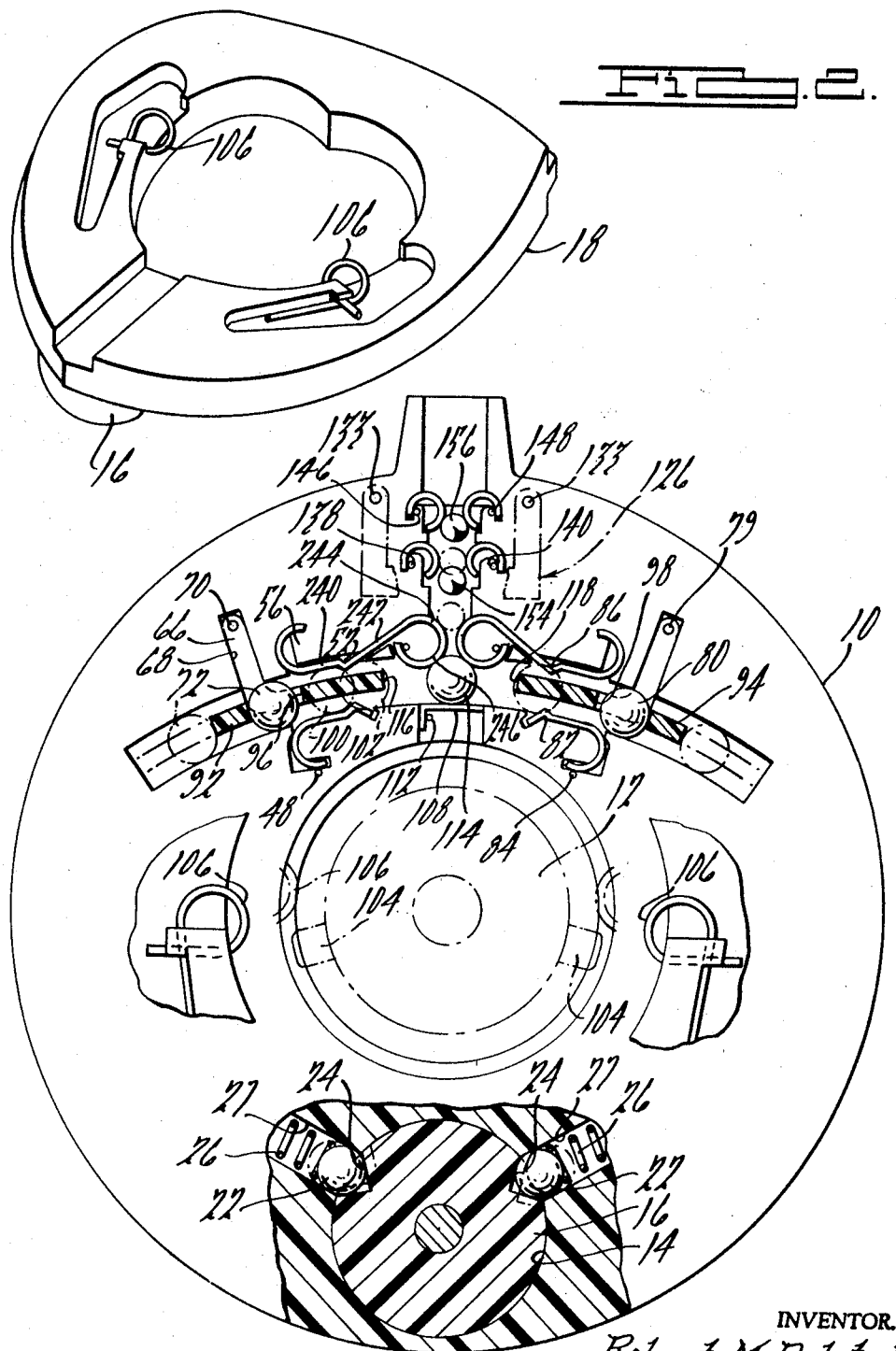

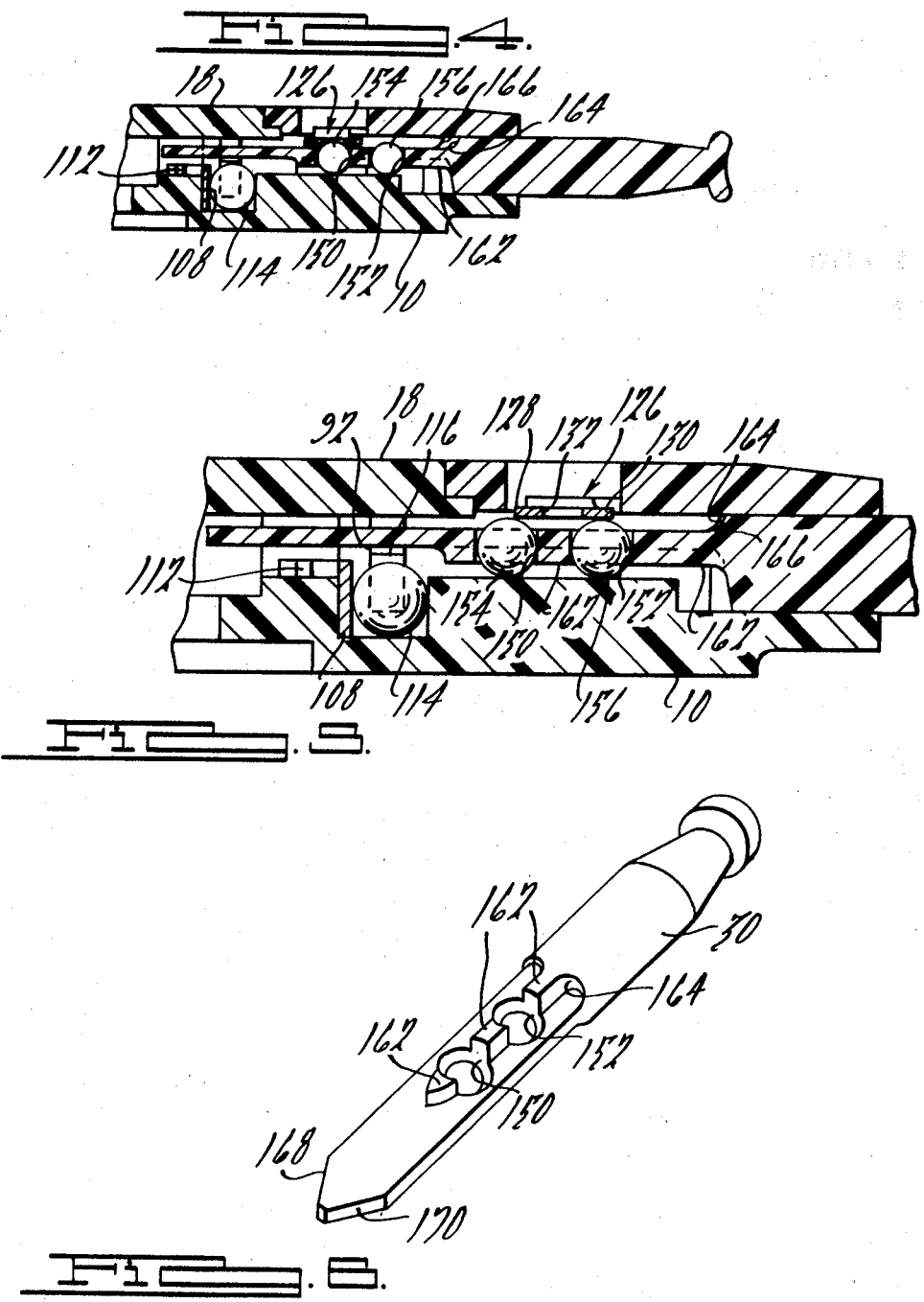

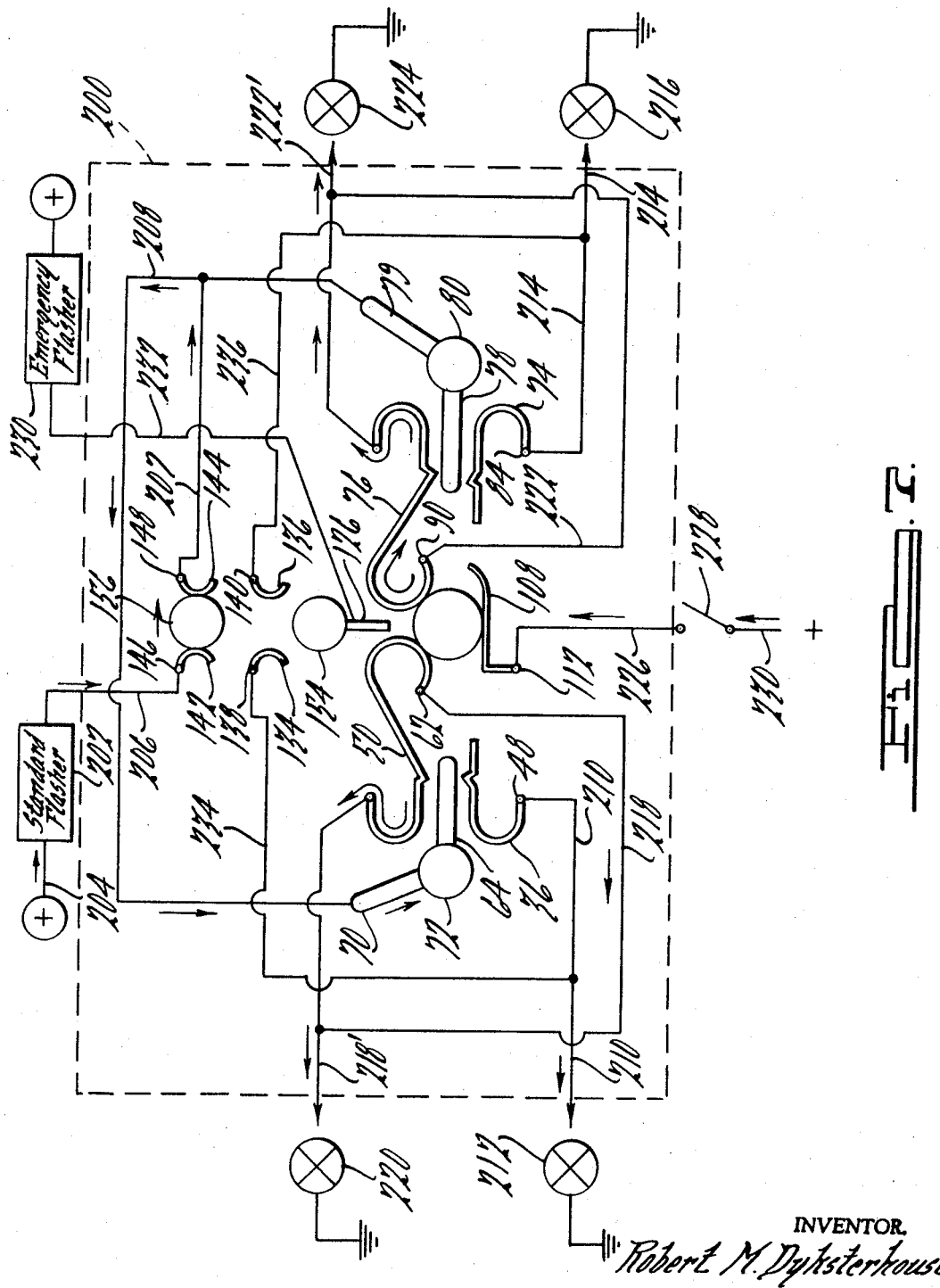

Patented May 29, 1973

INVENTOR.
Robert M. Dyksterhouse.

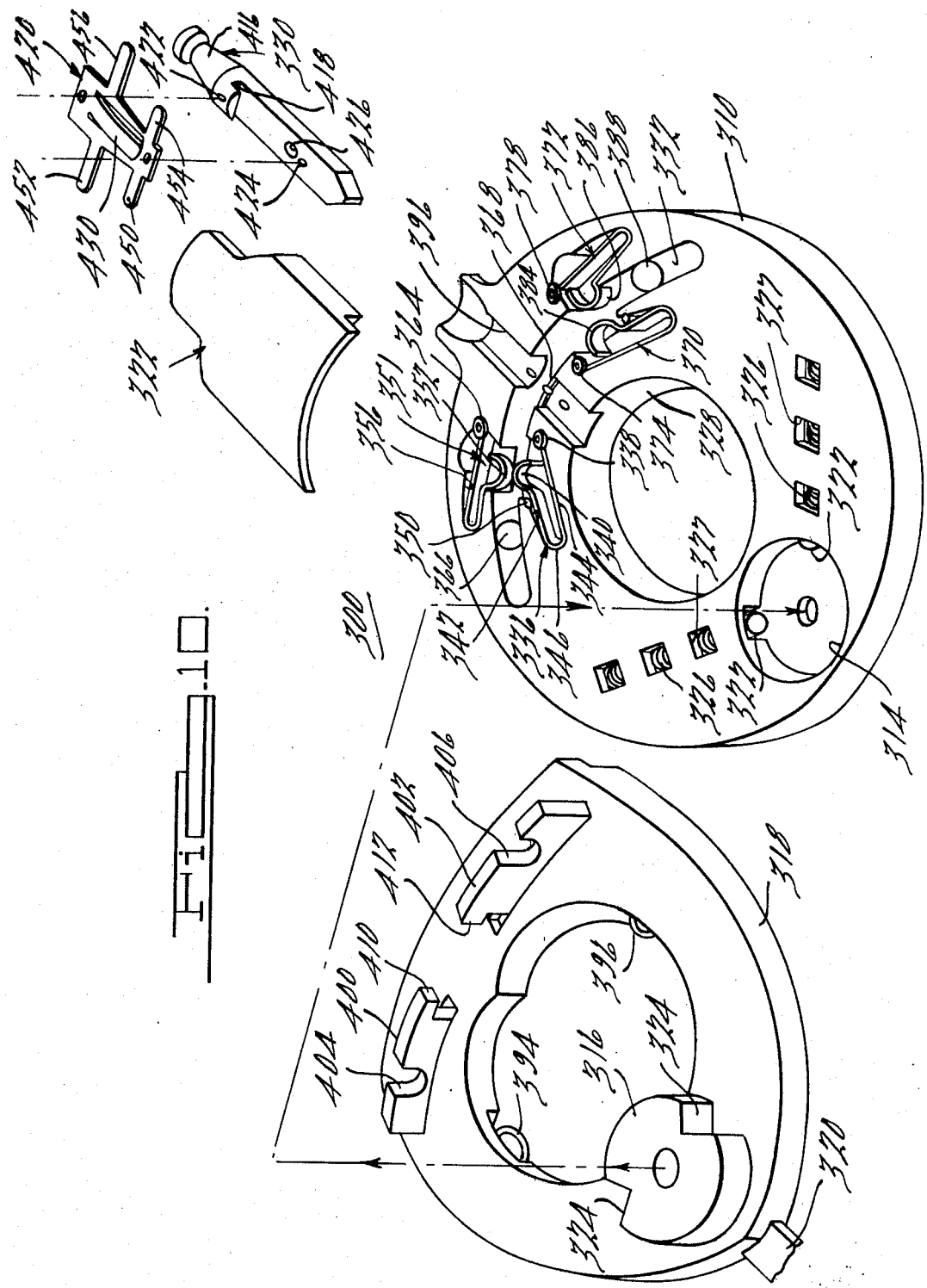

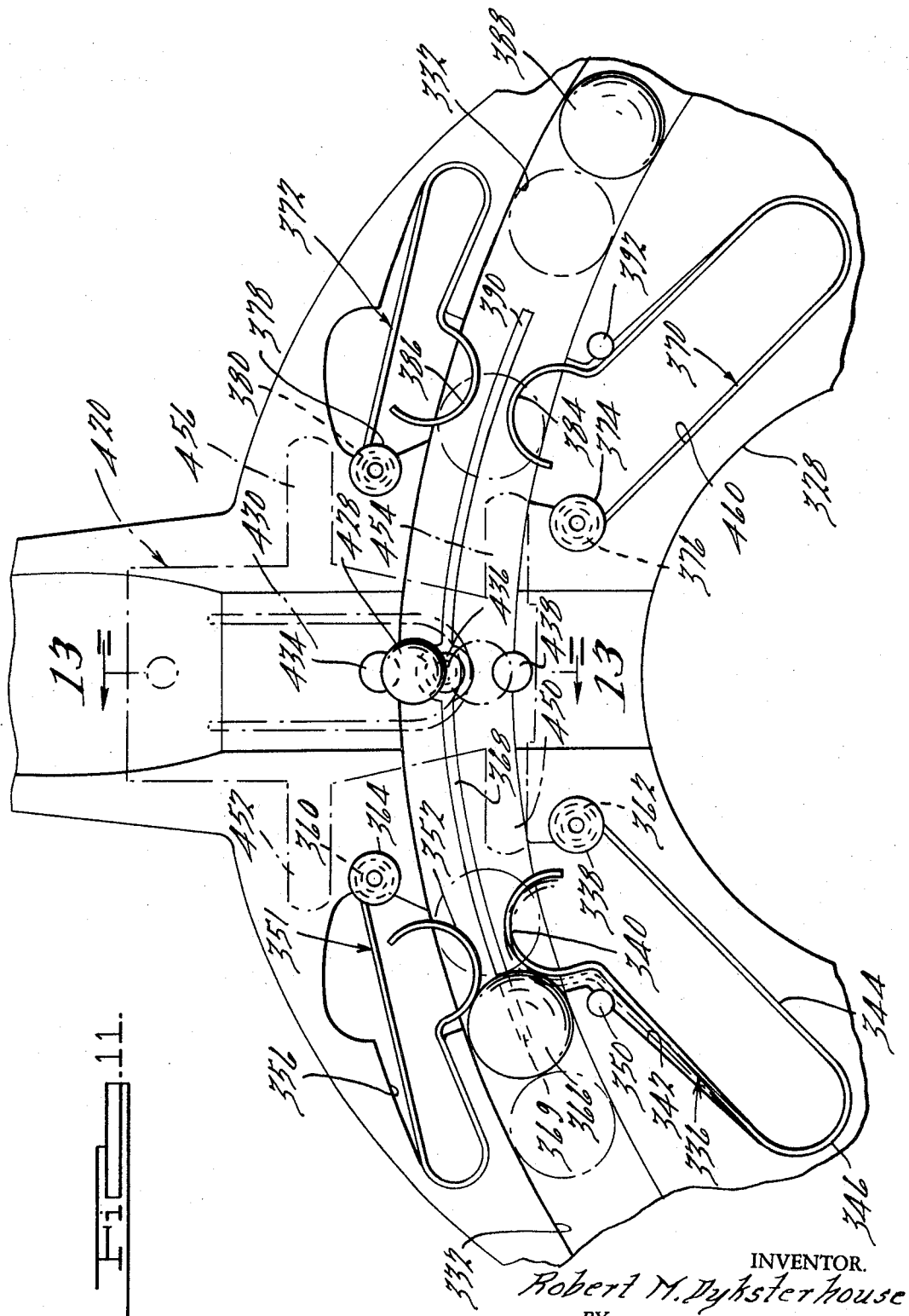

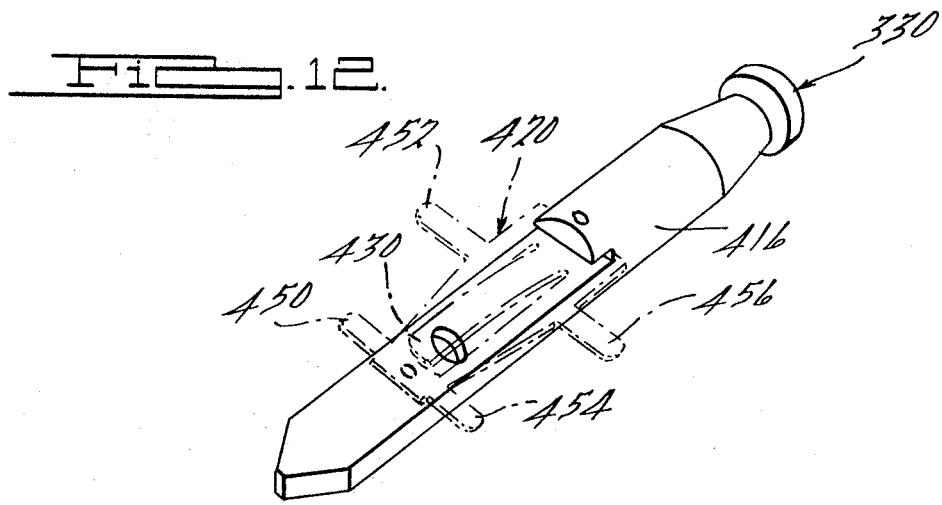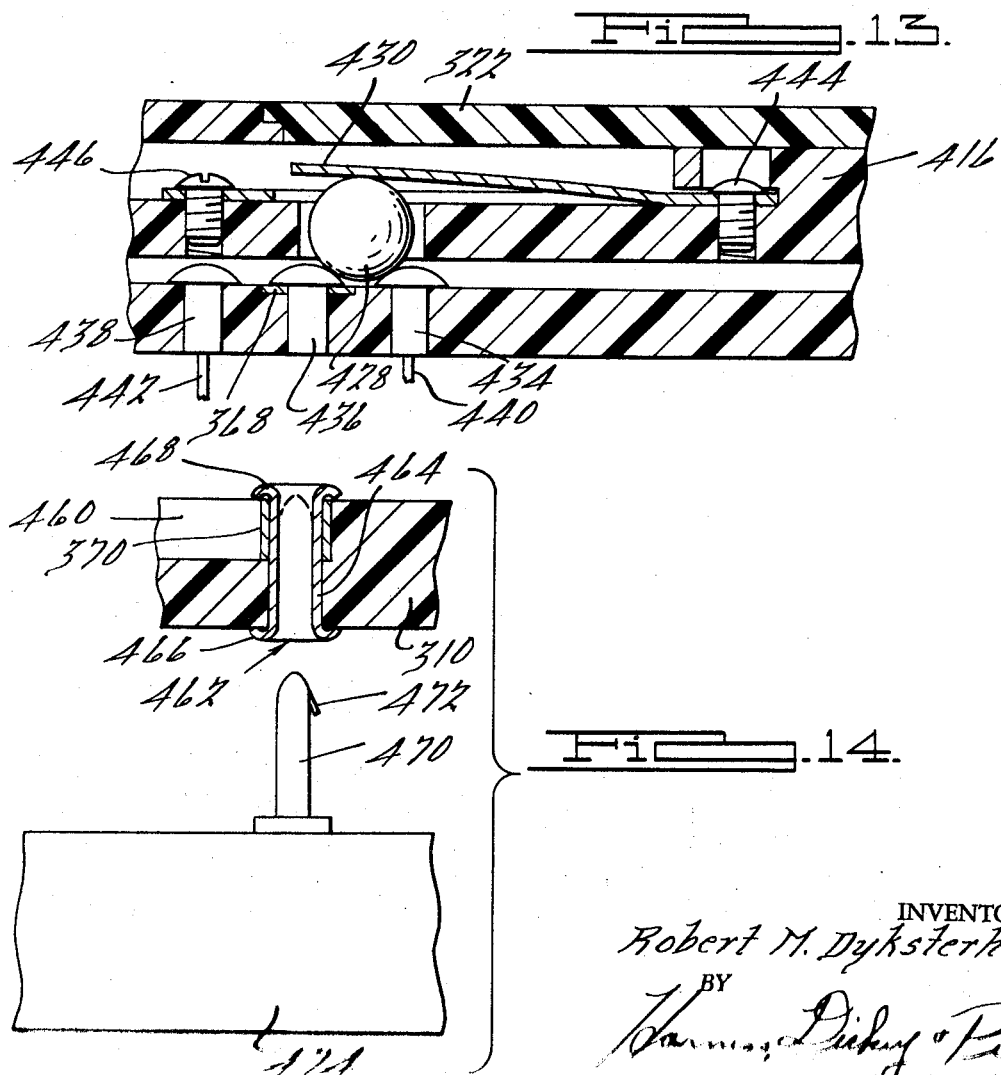

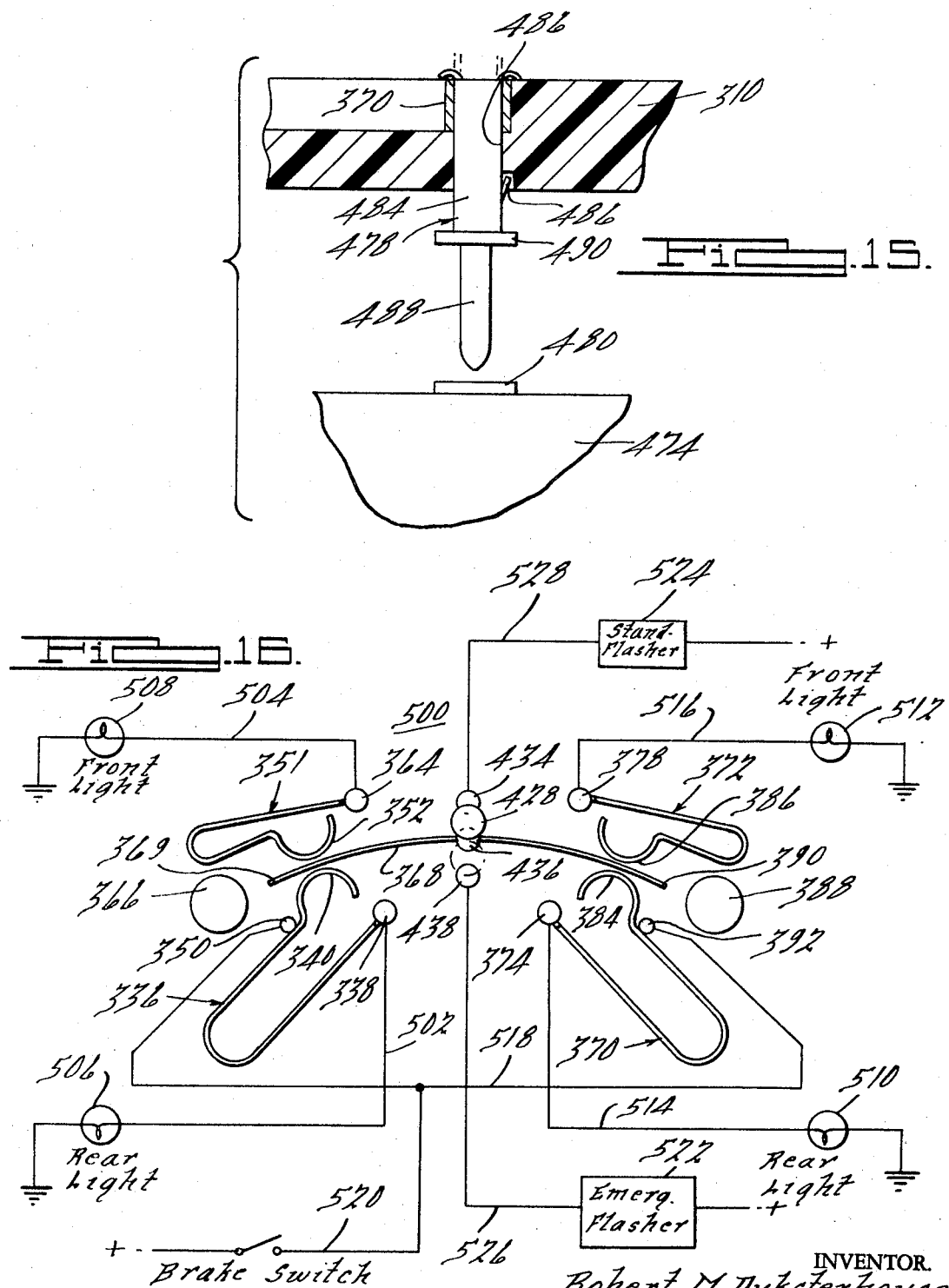

DIRECTIONAL SIGNAL APPARATUS

This application is a continuation-in-part of application Ser. No. 63,838, filed Aug. 14, 1970.

BACKGROUND AND SUMMARY OF THE INVENTION

This invention relates generally to a directional indicating switch and circuit and more particularly to a ball contact type of turn indicating switch and an improved flasher and sequential circuit. for interconnecting the lamps of the vehicle with the source of power.

Conventional turn signal switches of the type presently being utilized on vehicles, while performing the necessary switching functions, are prone to a number of defects. For example, the conventional armature type of switch is subject to broken switch blades and dirty contacts thereby rendering the device inoperative. Furthermore, certain mechanisms within the switch may jam the steering mechanism under certain fault conditions of the switch. Also, prior conventional type of turn signal switches have been designed to be utilized in conjunction with specific automobile models while universality of turn signal switches for all vehicles is desired.

With the system of the present invention, many of these defects have been alleviated and simple, compact, integral structure has been provided which includes all of the necessary functions for signaling the intentions of a vehicle operator. For example, the switch of the present invention includes the right and left turn signal functions, a lane changing function and an emergency four-way flash function.

Further, in conventional turn signaling systems, certain automotive manufacturers have incorporated a sequential energization of a plurality of indicating lamps on the right rear and left rear of the vehicle, depending on the direction of the turn intended. However, these systems have involved the use of complicated electronic timing circuits, thus increasing the manufacturing costs, installation and maintenance time and cost.

With the system of the present invention, an extremely simple and highly reliable sequencer circuit has been provided which minimizes the aforementioned problems.

Accordingly, it is one object of the present invention to provide an improved directional turn signal indicator switch.

It is another object of the present invention to provide an improved ball contact type of directional indicator switch.

It is still further object of the present invention to provide an improved directional turn signal indicating switch which is compact, highly integrated and easily attached to the steering mechanism of the vehicle.

It is a further object of the present invention to provide an improved ball-type turn signal switch which includes all of the functions of lane changing, turn and emergency four-way flash indication in a single unit.

It is still a further object of the present invention to provide an improved ball type turn indicating switch having improved electrical circuit contacting characteristics.

It is another object of the present invention to provide an improved turn signal indicating switch which is simple to manufacture, easy to install and highly reliable.

It is still a further object of the present invention to provide an improved control circuit for a turn signal indicating system utilizing the ball type turn signal indicating switch described above.

It is still another object of the present invention to provide an improved sequential system for indicating a turn of a vehicle.

It is a further object of the present invention to provide an improved sequencer system utilizing a minimum number of elements.

It is still a further object of the present invention to provide an improved turn signal control system which is reliable in operation and utilizes a minimum number of wires to provide the control function for the various lamps of the vehicle.

It is a further object of the present invention to provide an improved turn signal indicating system which is capable of being manufactured as a plug-in module.

Further objects, features and advantages of this invention will become apparent from a consideration of the following description, the appended claims and the accompanying drawings in which:

FIG. 1 is an exploded view of a preferred embodiment of the switch mechanism incorporating certain features of the present invention;

FIG. 2 is a top view of the actuator of FIG. 1 illustrating certain features of the return mechanism;

FIG. 3 is a plan view partially broken away of the actuator mechanism illustrating the relative positions of the contact balls during selected modes of operation;

FIG. 4 is a cross-sectional view of the emergency, four-way flash actuating mechanism in the neutral position;

FIG. 5 is a cross-sectional view of a portion of FIG. 4 illustrating the four-way flash mechanism in the four-way flash mode of operation;

FIG. 6 is a perspective view of the four-way flash actuator handle as viewed from the bottom thereof;

FIG. 7 is a schematic diagram illustrating the interconnection of the switch assembly of FIGS. 1 through 6 into circuit with the flashers and lamps of the vehicle;

FIG. 10 is an exploded view of another preferred embodiment of a switch mechanism incorporating certain features of the present invention;

FIG. 11 is a top view of the actuator of FIG. 10 illustrating certain features of the return mechanism and the mechanical connection terminals for the electrical circuitry;

FIG. 12 is a perspective view of the emergency four-way flash actuating mechanism including the spring contacts and the actuator ball;

FIG. 13 is a cross-sectional view of the emergency four-way flash operator in position in the base member of FIG. 10 and illustrating the relationship of the ball with certain of the electrical contacts;

FIG. 14 is a composite view, partially in cross-section, illustrating certain features of one preferred form of plug-in mechanism in the case where the module is assembled as a plug-in type unit;

FIG. 15 is another composite view, also partially in cross-section, illustrating another type of plug-in mechanism; and FIG. 16 is a schematic diagram illustrating the inner connection of the switch assembly of FIG. 10 and including the lapse flasher circuits and brake switch.

Figure 8:
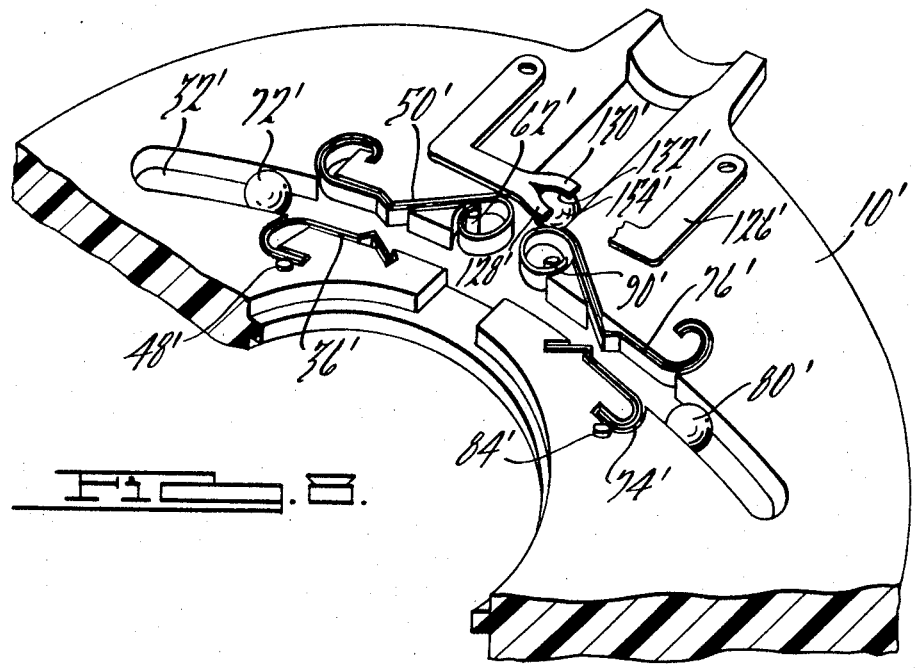
FIG. 8 is a modified form of the switch assembly of FIG. 1.

Referring to the drawings and particularly to FIGS. 1 to 6 thereof, the improved turn signal indicator and emergency flasher device of the present invention includes a housing 10 which is adapted to be mounted coaxially with the steering shaft 12 of an automobile. The base 10 has a cylindrical recess 14 at one side thereof which receives a generally cylindrical drum 16 of an actuator 18 to pivotally mount the actuator 18 relative to the housing 10. The drum 16 may be formed integrally with the actuator 18 or otherwise suitably secured thereto for movement therewith. The actuator 18 is provided with a handle 20 for manually moving the actuator 18 to operate the turn signal device. The actuator 18 is urged toward and yieldably held in a central or neutral position by a pair of balls 22 mounted in said base 10, the balls 22 being urged into angularly spaced V-shaped notches 24 formed in the cylindrical surface of the drum 16 by springs 26 supported in apertures 27 formed in the base 10.

The base 10 has a central opening 28 in which the steering shaft 12 may rotate and, at the opposite side of the central opening 28 from the actuator drum recess 14, the base 10 carries an emergency flasher control member 30 and the hereinafter described contact elements which provide the desired switching actions in response to manual operation of the turn signal actuator 18 and the emergency flasher control member 30.

In the preferred embodiment illustrated in FIGS. 1 to 6, the base 10 has an elongated arcuate slot 32 extending equal distances on opposite sides of a centerline 34 through the center of the opening 28 and through the center of the actuator drum recess 14. It will be noted that the slot 32 describes an arc of a circle having a center approximately at the center of drum 16. The contacts for indicating a right turn are mounted in the base 10 to the left of this centerline 34 as viewed in FIGS. 1 and 3 and include a first strip contact 36 mounted in the base 10 with its opposite ends 38 and 40 received in cooperating recesses 42 and 44. Intermediate its ends 38 and 40, the contact 36 extends along the inner side of the arcuate slot 32 and includes a detent portion 46 in the form of an angular bend extending toward the opposite side of the slot 32. The end portion 38 of the contact 36 is connected to a terminal post 48 in a suitable manner as by a friction fit or soldering, and the intermediate portion, including portion 46, is spaced from the inner side of the arcuate slot 32 to permit limited resilient movement of the strip 36.

A second strip contact 50 extends along the outer side of the slot 32 and includes a detent portion 52 extending toward the detent portion 46 of the contact 36. The outer end 54 of the contact 50 is received in a cooperating recess 56 and inwardly of the detent 52 the contact strip 50 extends through a slot 58 and terminates in an inner end loop 60 which is disposed adjacent the centerline 34 and projects into the slot 32. Also, the loop 60 is connected to terminal post 62 in a manner similar to strip 36.

The right turn contact group also includes a third strip contact 64 which extends along the bottom of the slot 32 between contacts 36 and 50 and the detents 46 and 52 thereof. The contact 64 has an end portion 66 extending transversely of the slot 32 in a slot 68 and connected to a terminal post 70. The right turn contact group also includes a contact ball 72 movable along the slot 32 by the actuator 18, as hereinafter described, to simultaneously engage the contact strips 36, 50 and 64 when the lever 20 has been moved to the right turn or lane-change mode of operation.

At the right hand side of the centerline, 34, as viewed in FIGS. 1 and 3 is a left turn contact group consisting of strip contacts 74, 76 and 78 and a ball contact 80, which group is a mirror image of the right turn group including contacts 36, 50 and 64, and a ball contact 80. The contact 74 has a detent 82 connected to a terminal post 84, and the contact 76 has a detent 86 and an end loop 88, adjacent the centerline 34, connected to a terminal post 90.

The positions of the contact balls 72 and 80 are determined by the actuator 18 which has a pair of spaced bosses 92 and 94 projecting into the slot 32 and movable therealong during pivotal movement of the actuator 18 relative to the base 10. The bosses 92 and 94 have ball pockets 96 and 98 which receive the ball contacts 72 and 80, respectively, for sliding the balls 72, 80 within slot 32 during left and right movement of actuator 18. In the central or neutral position of the actuator 18, the ball contacts 72 and 80 are in the neutral positions shown in full lines in FIG. 3.

As the actuator 18 is pivoted by the handle 20 in a clockwise direction relative to the base 10 as viewed in FIG. 3, the ball 72 is rolled along the contact 64 into engagement with and between the contacts 36 and 50 into what may be called a "lane changing position" indicated at 100, in which it may be held by pressure on the handle 20, for a temporary indication of turning to the right as may be desired when moving to a lane to the right. If the handle 20 is released when the actuator 18 is in this lane changing position, it will return to its center or neutral position returning the ball contact 72 to its neutral position out of engagement with the contacts 36 and 50.

If, however, the driver continues to move the handle 20 to further move the actuator 18 counterclockwise relative to the base 10, the ball contact 72 will be moved past the detents 46 and 52 which upon release of the handle 20 will yieldably hold the actuator 18 against return to its neutral position. This normal or standard right turn position of ball contact 72 is indicated at 102 and, in this position (as in the lane change position 100), the ball contact 72 simultaneously engages the strip contacts 36, 50 and 64. It will be appreciated that during the above described movement of the ball contact 72, the ball contact 80 moves in the same direction, toward the adjacent end of the slot 32 and remains out of engagement with the contacts 74 and 76. From this normal right turn position the turn indication is cancelled in a conventional way by a cam 104 carried on the steering shaft 12 engaging a spring loop 106 on the actuator 18 to move the actuator 18 counterclockwise relative to the base 10. Thus, the ball contact 72 moves over the detents 46 and 52 and permits the actuator centering springs 26 to return the actuator 18 to its neutral position. It will be noted that the degree of arcuate movement of the drum 16 of actuator 18 relative to the balls 22 is considerably less than the arcuate movement of the ball 72 due to the closeness of the balls 22 to the pivot point on drum 16. Thus, the balls 22 do not completely leave the notches 24 to provide the return force.

In the preferred embodiment a brake contact strip 108 is mounted in the base 10 in a recess 110 provided on the centerline 34 at the inner side of the slot 32 and is connected to a terminal post 112. A brake contact ball 114 is mounted in the slot 32 on the centerline 34 engaging the brake contact strip 108 and between and in engagement with the loops 60 and 88 of the contacts 50 and 76. The actuator bosses 92 and 94 are provided with spaced oppositely facing abutments 116 and 118. Upon signalling a normal right turn, the abutment 116 is adapted to engage the brake ball contact 114 before the ball contact 72 is moved past the detents 46 and 52 to move the ball contact 114 out of engagement with the loop 60. Upon signalling a normal left turn, the abutment 118 similarly moves the ball contact out of engagement with the loop 88. In this way, the brake signal will be present on the left side during a right turn but the but the right turn signal will take precedence or over-ride the brake signal. The opposite condition exists during a left turn.

The emergency flasher control member 30 is mounted in the base 10 for movement along the centerline 34 in a recess 120 defined by the base 10 and the base plate 122. The base plate 122 is recessed and apertured at 124 to receive a generally U-shaped emergency strip contact 126, the central portion of which is bifurcated to provide an inner strip portion 128 disposed adjacent the loops 60 and 88 of the contacts 50 and 76 and an outer strip portion 130, the strip portions 128, 130 forming a central opening 132. These portions 128 and 130 extend through the apertured base plate 122 and into recess 120 in which the emergency flasher control member 30 operates. One end of the emergency strip contact 126 is connected to a terminal post 133.

The base 10 also carries a pair of inner strip contacts 134 and 136 projecting into the recess 120 at opposite sides thereof and connected to terminal posts 138 and 140, respectively, and a pair of outer strip contacts 142 and 144 also projecting into the recess 120 at opposite sides thereof and connected to terminal posts 146 and 148, respectively. The emergency flasher control member 30 has a pair of spaced apertures 150 and 152 in which are mounted two ball contacts 154 and 156 which project above the upper surface 158 of an inner blade portion 160 of the member 30 for engagement with the portions 128 and 130 of the contact strip 126. The blade portion 160 has a downwardly extending central flange or ridge 162 for engaging and positioning the ball contacts 154 and 156.

The emergency flasher control member 30 is movable between an "off" position in which the inner ball contact 154 extends into the opening 132 in the contact strip and the ball contact 156 engages the contact strips 142 and 144, and an "on" position in which the ball contact 154 simultaneously engages the portion 128 of emergency strip contact 126 and loops 60 and 88 of contacts 50 and 76. The inner end of the blade portion 160 of the emergency flasher control member projects through the recess 110 above the brake contact 108 and is guided by the opposed side walls thereof. Inward movement of the member 30 is limited by engagement of a shoulder 164 thereon with a cooperating stop 166 on the base plate 122. The inner end of the member 30 has cam surfaces 168 and 170 adapted to be engaged by the steering shaft cam 104 for returning the member 30 to its "off" position upon rotation of the steering shaft when the emergency flasher control member 30 is in its "on" position.

The electrical circuit diagram for the preferred embodiment above described is illustrated in FIG. 7. The directional signal switch apparatus described above is represented by the portion of the diagram within the broken line rectangle 200. This device operates as a turn signal indicator through a standard flasher 202 connected to the vehicle battery by a conductor 204 and connected by conductor 206 to the terminal post 146 of contact 142.

The terminal post 148 of contact 144 is connected by conductor 207 to a conductor 208 which connects terminal post 70 of contact 64 to terminal post 79 of contact 78. Terminal post 48 of contact 36 is connected to a line 210 for supplying current to the right turn signal indicating lamps 212, 220 from flasher 202, ball 156 and conductor strip 64. Terminal post 84 of contact 74 is connected to a conductor 214 for supplying current to the left turn signal lamps 216, 224 from flasher 202, ball 156, and conductor strip 78.

Terminal post 62 of contact 50 is connected to a conductor 218 for supplying current to the right rear turn signal lamp 220 and terminal post 90 of contact 76 has connected thereto a line 222 for supplying current to the left rear turn signal indicating lamp 224 in the case of a brake signal. The brake strip contact terminal post 112 is connected to a source of battery voltage through a conductor 226, a brake switch 228 and a conductor 230. Thus, when the brake switch is closed by application of the brakes, current flows to the right and left rear lamps through switch 228, ball 114 and conductors 218 and 222, respectively. If a turn or lane change is indicated, the appropriate rear lamps are deprived of a brake indication because of the movement of ball 114.

It will now be appreciated that when the handle 20 is moved to move the ball contact 72 into engagement with the contacts 36 and 50, whether in the lane changing position 100 or in the normal turn position 102, a right turn is signalled by the completion of the circuits from the battery to the front and rear lamps 212 and 220. These circuits include a common portion from the battery through line 204, the standard flasher 202, the line 206, the contact 142, the ball contact 156, the contact 144, the lines 207 and 208, and the contact 64 to the ball contact 72. From the ball contact 72 the circuit to the front lamp 212 is through the contact 36 and the line 210 and the circuit to the rear lamp 220 is through the contact 50 and the line 218.

When the ball contact 72 is in its normal right turn position 102 the brake ball contact 114 is in its position shown in broken lines in FIG. 3 and if the brake switch 228 is closed the left rear lamp 224 is lit (continuously) by the completion of a circuit through line 230, brake switch 228, line 226, contact 108, ball contact 114, contact 76, and line 222 to left rear lamp 224. Since ball contact 114 is now out of contact with contact 50, the right rear lamp 220 continues to flash, unaffected by the closing of the brake switch 228.

When the emergency flasher control member 30 is moved to its "on" position it will be seen that the circuit is broken from the standard flasher 202 because the ball contact 156 has moved out of engagement with the contacts 142 and 144. However, circuits are completed through an emergency or heavy duty flasher 230 to all of the lamps 212, 216, 220 and 224. Tracing this circuit, energy flows from the emergency flasher 230 to the front flamps 212 and 216 through a conductor 232, the emergency strip contact 126, portion 130 thereof, a ball contact 156 from which the circuit to lamp 212 is through contact 134, conductor 234 and conductor 210 and the circuit to lamp 216 is through contact 136, conductor 236, and conductor 214. Energy also flows from the emergency flasher 230 the circuits to the rear lamps 220 and 224, through line 232, emergency contact 126 and portion 128 thereof to ball contact 154 from which the circuit to lamp 220 is through contact 50 and line 218 and the circuit to lamp 224 is through contact 76 and line 222.

From the foregoing it will be appreciated that the improved turn signal indicator and emergency flasher device of the present invention is simple in construction, economical to manufacture, and reliable and efficient in operation. In the preferred embodiment illustrating the device, the part within the broken rectangle on the circuit diagram, FIG. 7, has seven wires connected to it, lines 206 and 232 for connection to the flashers 202 and 230, respectively, lines 210, 214, 218' and 222' for connection to the lamps 212, 216, 220 and 222, respectively, and line 226 for connection to the brake switch 228. The device also has five movable ball contacts 72, 80, 114, 154 and 156, two of which (ball contacts 72, 80) are movable by the actuator 18 for signalling lane changing turns and together with ball contact 114 are movable for indicating normal turns. The movement of the contact 114 prevents closing of the brake switch 228 from interfering with the flashing of the rear turn signal lamp.

The other two ball contacts 154, 156 are movable by the emergency flasher control member 30, the ball contact 156 being effective in the "off" position of the member 30 to complete a circuit through the standard flasher 202 and being effective in the "on" position of the member 30 to complete a circuit through the emergency flasher 230 to the front lamps 212, 216. The other ball contact 150 is inoperative in the "off" position of member 30 and, in the "on" position, it completes a circuit through the emergency flasher 230 to the rear lamps 220 and 224. It will be noted that in this embodiment the contacts 50 and 76 each have four contact functioning portions.

Referring to FIG. 3, illustrating contact 50, there is a first portion 240 disposed outwardly of the detent 52 and engaged by the ball contact 72 in signalling a lane changing turn, a second portion 242 inwardly of the detent 52 and engaged by the ball contact 72 in signalling a normal turn, a third portion 244 on the outer side of loop 60 engaged by the ball contact 154 during operation of the emergency flasher 230, and a fourth portion 246 at the inner side of the loop 60 engaged by the brake ball contact 114 except when the actuator 18 is positioned for signalling a normal turn to the right. A similar situation occurs for the opposite contact 76. Thus, one contact element is utilized for several and varied purposes, i.e., to establish certain precedences of the various modes of operation of the switch. Thus, inter alia emergency four-way flash will take precedence over turn signal or lane changing modes, brake takes precedence over emergency flash and turn signal takes precedence over brake.

Figure 9:
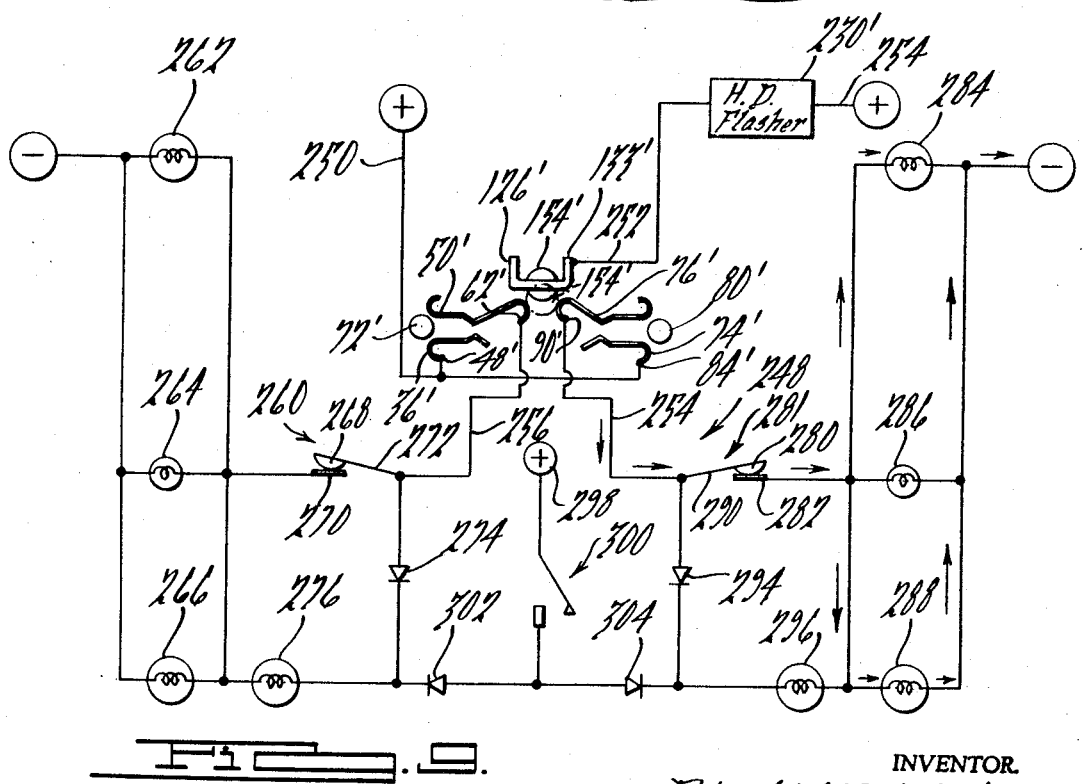
FIG. 9 is a schematic diagram of a modification of the system of FIG. 7 utilizing normal or standard flashers and is adapted to be utilized with the switch of FIG. 8. This circuit also illustrates a preferred form of sequencer.

There is also contemplated a modified form of the switch assembly and circuit described in FIGS. 1 to 7, the modified form being illustrated in FIGS. 8 and 9. As will be noted from the following description, FIG. 9 also illustrates a sequencer circuit which represents a preferred form of the sequencer concept. As will be seen from the description of FIGS. 8 and 9, the modified form permits the elimination of seven of the strip contacts and two of the ball contacts utilized in the system of the described FIGS. 1 to 7 through the use of dual flasher units and diode assembly generally indicated at 248. In this modified embodiment, with the exception noted, the construction and elements of the turn signal and emergency switch assembly are the same as those described in the first embodiment and are identified by the same reference characters with a prime added. It will be noted that the second embodiment omits the strip contacts 64, 74, 134, 136, 142, 144 and 108 and ball contacts 114, and 156. Also, the corresponding terminal posts of these strip contacts and the recess 68 and the aperture 152 are eliminated.

As in the first embodiment, the actuator element 18 is adapted to move ball contacts 72' and 80' in an arcuate fashion within the slot 32'. For a left hand turn, the ball 72 is moved into the area between contact strips 36' and 50' and thence past the detent portions to energize contact 50' from the electrical energy being fed to the strip 36'. The return mechanism described above will then cancel the signal being fed to the left turn lamps and return ball 72' to its original neutral position. For an opposite turn, the opposite condition exists with ball contact 80'. Thus, the turning and lane changing signals are presented to the circuitry 248 which will provide a pulsed output to the lamps as will be described hereinafter.

In the emergency four-way flash operation, the four-way flash actuator described above is pushed inwardly to move ball contact 154' from the position shown in FIG. 8 to a position in contact with strip contacts 50', 90'. As will be seen from the description of FIG. 9, a heavy duty flasher is connected to the U-shaped strip 126' thereby providing electrical energy from the strip 126' to the vehicle lamps through ball contact 154' and strips 50', 76'. It will be noted that the emergency four-way flash mode of operation will precede or take precedence over the turn signal mode of operation.

Referring now to FIG. 9, the turn signal switch assembly described in conjunction with FIG. 8 is illustrated in circuit with the battery and vehicle lamps. Particularly, the terminal posts 48' and 84' of the strip contact 36' and 74' are interconnected by a conductor 250 to the vehicle battery and the emergency strip contact 126' is connected to the battery source through terminal 133', a conductor 152 and the heavy duty flasher circuit 230'. In this way, the energy from the battery and the emergency flash mode of operation is fed through the contact 126' and the ball contact 154' (shown in the dotted position) to the strip contacts 50' and 76'.

In the right turn mode of operation, the ball contact 80' is moved into contact with both the strip contact 74', 76' to energize an output conductor 254. On the other hand, for a left turn, the ball contact 72' is moved into contact with the strip contacts 48' and 50' to energize an output conductor 256. It will be noted that the energy being supplied to conductors 254, 256 solely as a result of the positioning of ball contact 72' and 80' will provide constant energization to the lines 254 or 256.

Referring first to the left turn signal, the conductor 256 is energized to supply energy to a flasher unit 260 which is connected in series with a left front lamp 262, a left pilot lamp 264 an a left rear lamp 266. Accordingly, upon initial energization of the line 256, energy will flow through the flasher unit 260, including a movable contact 268 and a stationary contact 270, to the parallel connected lamps 262, 264, 266. The arm 272, supporting the movable contact 268, is a thermally responsive element, such as a bimetal, which may be either self-heated by current flowing through the bimetal or may be provided with a separate heater to cause the bimetal to curl upwardly in response to current flowing across the closed contacts 268, 270. After a predetermined time lapse, the contacts 268, 270 will separate to open the circuit between conductors 256 and lamps 262, 264, 266. Current will then flow from the conductor 256, through a diode 274, to energize a lamp 276. However, insufficient current will then flow through lamps 262, 264, 266 to maintain the illumination of these latter lamps. Thus, upon actuation of the turn signal switch, lamp 266 will first be energized and then will be extinguished and lamp 276 will be energized. These latter two lamps will then sequence back and forth during the period that the left turn signal is signaled by the switch.

On the other hand, when a right turn signal is required, current will flow through a set of normally closed contacts 280, 282 to the corresponding parallel connected right lamps 284, 286 and 288. Upon heating of the bimetal arm 290, the contacts 280, 282 will open and current will flow through a diode 294 to an inboard lamp 296 to energize the inboard lamp 296 and deenergize the lamps 284, 286, 288.

A brake signal is provided from the battery source at input terminal 298 through a normally open brake switch 300. Upon closure of the brake switch 300, and assuming that neither turn signal switch is closed, current will flow through a diode 302 to the lamp 276, thus illuminating the lamp 276. On the other hand, current will also flow through a diode 304 to the illuminate lamp 296. It will be noted that the lamps 262, 264 and 266 and 284, 286 and 288 will not be illuminated in the brake mode of operation. It will be further noted that the closure of the turn signal switch after the closure of the brake switch 300 will cause lamp 276 to be extinguished due to the fact that the full battery voltage is applied to both ends of the lamp 276. However, the opposite side, in the case of a left turn, will be illuminated in the normal brake mode of operation.

In the emergency flash mode, the ball contact 154' bridges the gap between contact 126' and contacts 50', 76' to supply pulsed energy to the conductors 254, 256. In order to eliminate the effect of the flashers 260, 281, the duty cycle of the heavy duty flasher 230' is designed to be less than the duty cycles of flashers 260, 281. In this way the "on" time of the pulse from flasher 230' is insufficient to provide enough energy to open contacts 268, 270 and 280, 282.

Referring now to FIGS. 10–13, there is illustrated a preferred modification of the turn signal indicator and emergency flash device described above. The modified assembly 300 includes a housing 310 which is adapted to be mounted coaxially with the steering shaft (not shown) of an automobile. The base 310 is formed with a cylindrical recess 314 at one side thereof which receives a generally cylindrical drum 316 of an actuator 318 to pivotally mount the actuator 318 relative to the housing 310. The drum 316 may be formed integrally with the actuator 318 or otherwise suitably secured to the actuator for movement therewith. The actuator 318 is provided with a handle 320 for manually moving the actuator 318 to operate the turn signal device. The actuator 318 is urged toward and yieldably held in a central or neutral position by a pair of balls 322 mounted in the base 310, the balls 322 being urged into angularly spaced V-shaped notches 324 formed in the cylindrical surface of the drum 316 by springs 326 supported in apertures 327 formed in the base 310.

The base 310 has a central opening 328 in which the steering shaft (not shown) may rotate and, at the opposite side of the central opening 328 from the actuator drum recess 314, the base 310 carries an emergency flasher control member 330 and the hereinafter described contact elements which provide the desired switching actions in response to manual operation of the turn signal actuator 318 and the emergency flasher control member 330.

In the preferred embodiment illustrated in FIGS. 10–13, the base 310 has an elongated arcuate slot 332 extending equal distances on opposite sides of a center line 334 through the center of the opening 328 and through the center of the actuator drum recess 314. It will be noted that the slot 332 describes an arc of a circle having a center approximately the center of drum 316. The contacts for indicating a right turn are mounted in the base 310 to the left of the centerline 334, as viewed in FIGS. 10 and 11, and include a first strip contact 336 mounted in the base 310 with one end thereof being attached to the base 310 by means of a rivet 338 and the other end 340, generally in the shape of a semicircle, being free to move within the confines of an aperture 342.

The intermediate straight portion 344 closely fits within the aperture 342, as does the arcuate portion 346. However, the portion between the semicircle 340 and the arcuate portion 346 is spaced from the corresponding walls of the recess 342 to permit the positioning of a contact element 350 adjacent this latter portion for a purpose to be hereinafter explained. It is to be understood that the contact 350 could also be embedded within the body 310 and an exposed face be presented to the cooperating portion of the strip element 336. However, this latter arrangement could permit faulty contact action.

A second strip contact 351 extends along the outer side of the slot 332 and includes a detent portion 352 extending toward the corresponding detent portion 340 of the contact 336. The remainder of the contact 350 is received in a cooperating recess 356, the remaining portion terminating an inner end loop 360 which is fastened to the base member 310 by means of a rivet 364.

The loop 360 and the corresponding loop 362 of terminal strip 336 are of smaller diameter than the shank of the corresponding rivets 364, 338 to provide a squeezing engagement between the loops and the rivets thereby enhancing the electrical contact characteristics thereof. The detent elements 340, 352 are devised and so positioned that a right turn ball 366 moving to the right in the slot 332 engages one of the contacts 340, 352 before it engages the other, thus extending the life of the contact element 336, 351.

The right turn contact group also includes a strip contact 368 which extends along the bottom of the slot 332 between contacts 336 and 351. The contact 368 has an end portion 369 extending into the area below the lane changing position of the ball 366 but short of the dotted neutral position illustrated in FIG. 11.

When the actuator 318 has been moved to the right, the ball 366 is moved to the solid position illustrated in FIG. 11 wherein the ball contacts the end 369 of the strip element 368 and also contacts the detent elements 340,352. It will be noted that the ball 366 engages the detent portion 340 before it engages the detent portion 352. In this way the contact life is extended. It will also be noted that the engagement of the ball 366 with the portion 340 moves the contact element 336 away from the terminal post 350, thereby disconnecting the brake switch from the operation of the circuit. Thus, as described above, the actuation of the right turn mechanism will override the brake signal whereby the right lamps will flash in a right turn mode of operation irrespective of the operation of the brake switch. The position illustrated for the ball 366 is the lane changing position and, upon further movement of the actuator 318, the ball 366 will pass between the detent portions 340, 352 a sufficient distance to hold the ball 366 against return movement.

The left turn mechanism is identical to that described in conjunction with the right turn and includes a pair of spring elements 370, 372, one end of the element 370 being secured to a rivet member 374 by means of a loop portion 376 engaging the shank of the rivet 374. As was the case with the right turn mechanism, the loop 376 has a smaller inside diameter than the outside diameter of the shank of the rivet thereby providing good electrical contact. The other spring element 372 is similarly connected to the base member 310 by means of a rivet 378, the loop portion 380 also forming an extremely tight fit with the shank of the rivet 378.

The members 370, 372 include detent portions 384, 386 which are adapted to be engaged by a ball 388 in an identical operation as was described in conjunction with the right turn ball 366. The strip 368 includes an end portion 390 which is engaged by the ball 338 to provide a connection from the strip 390, which is energized from a flasher circuit to be described. The right hand portion of the assembly (the left turn section) also includes a brake switch terminal 392 which is adapted to engage the spring element 370 when the spring element 370 is not engaged by the ball 388. The terminal 392 serves the same purpose as that described in conjunction with the terminal 350.

As the actuator 318 is pivoted by the handle 320 in a clockwise direction relative to the base 310 as viewed in FIGS. 10 or 11, the ball 366 is moved along the contacts 340, 352 into the "lane changing position," indicated in full line in FIG. 11. The ball is held in position by continued pressure on the handle 320 for a temporary indication of turning to the right as may be desired when moving into a lane to the right. If the handle 320 is released when the actuator 318 is in this lane changing position, it will return to its central and neutral position returning the ball contact 366 to its neutral position out of engagement with the contacts 340, 352.

If, however, the operator continues to move the handle 320 to further move the actuator 318 clockwise relative to the base 310, the ball contact 366 will be moved past the detents 340, 352 which, upon release of the handle 320, will yieldably hold the actuator 318 against return to its neutral position. This normal or standard right turn position of ball contact 366 is indicated in dotted lines to the right of the full line view of ball 366. In this position, as in the lane changing position shown at 366, the ball contact 366 simultaneously engages the strip contacts 340, 352 and 368.

It will be appreciated that, during the above described movement of the ball contact 366, the ball contact 388 moves in the same direction toward the right end of the slot 332 and remains out of engagement with the contacts 384, 386. From this normal right turn position, the turn indication is cancelled in a conventional way by a cam similar to that described in conjunction with FIG. 3. The cam engages a pair of spring elements 394, 396 mounted in the actuator assembly 318 to return the actuator 318 to its neutral position. It will be noted that the degree of arcuate movement of the drum 316 of actuator 318 relative to the balls 322 is considerably less than the arcuate movement of the ball 366 due to the closeness of the balls 322 to the pivot point on the drum 316. As was the case with the above described embodiments, the balls 322 do not completely leave the notches 324 to provide the necessary return force for the actuator 318.

Electrically, and as will be seen from a description of FIG. 16, the left front light is connected to the rivet 378 and the left rear light is connected to the rivet 374. Similarly, rivets 364 and 338 are connected to the right front and right rear lights respectively.

Electrical energy is supplied directly to the terminals 350, 392 through the brake switch actuated by the brake pedal. Thus, when the brake is actuated and no turn signal indication is required, electrical energy will flow through the brake switch to the terminals 350, 392 and thence to the right and left rear lights respectively through the contact strips 336, 370 and rivets 362, 374 respectively.

The positions of the contact balls 366, 388 are determined by the actuator assembly 318 which includes a pair of spaced bosses 400, 402 projecting into the slot 332 and movable therealong during pivotal movement of the actuator 318 relative to the base 310. The bosses 400, 402 are formed with ball pockets 404, 406 which receive the ball contacts 366, 388, respectively, for sliding the balls 366, 388 within slot 332 during left and right movement of the actuator 318. The actuator bosses 404, 406 are provided with spaced oppositely facing abutments 410, 412 wherein, upon signalling a normal right turn, the abutment 410 is adapted to engage the brake ball contact 114 in the previously discussed embodiments of the invention. However, these abutments are not utilized in the embodiment of the present modification.

The emergency flasher control member 330 is mounted in the base 310 for movement along the centerline 334 in the recess 396 formed in the base member 310 and a base plate element 422. The cover member 322 fits over the top of the slot 396 to protect the actuator assembly 330. Specifically, the actuator assembly 330 is made up of a handle member 416 which is formed with a slot 418 into which is received a spring member 420 utilized as a contact element. The spring member 420 fits into the slot 418 and a screw 444 is passed through a threaded hole 422 to fasten the spring to the handle. A second screw 446 is passed through the spring member 420 and to a second threaded aperture 424.

The handle member 416 is provided with a third contact ball receiving aperture 426 into which is placed an emergency brake contact ball 428, best illustrated in FIG. 13. The spring element 420 is made up of a central cut-out member 430 which is slightly offset from the main plane of the spring member 420. As is seen in FIG. 13, the cut-out portion 430 is utilized to resiliently bias the ball contact 428 into good electrical engagement with three contacts 434, 436, 438 formed at the bottom of the slot 396. It is to be noted that the contact 436 is also utilized to rivet or fasten the strip contact 368 to the base element 310.

As will be seen from a description of FIG. 16, the contact 434 is electrically connected to a standard flasher unit by means of a conductor 440, and the contact 438 is connected to an emergency flasher unit by mean of a conductor 442.

As the handle 416 is moved inwardly, the spring member 420 and the ball in aperture 426 are also moved inwardly. The ball, (FIG. 13) moves from between the contact heads of the rivets 434, 436 to a position which is between the contact heads of rivets 436, 438. In this way, the electrical circuit is switched from an interconnection between the standard flasher connected to the rivet 434 and the metallic strip conductor 368 to a connection between the emergency flasher and the contact strip 368, the connection being made through the ball member 428. It is to be noted that the spring member 420 is fastened to the handle 416 by means of the screws 444 and 446 (FIG. 13).

Referring back to FIG. 11, the spring element 420 is illustrated in dotted lines, the position shown being the position for standard operation or no emergency four-way flash. The spring element 420 is provided with four projections, 450, 452, 454, 456 which lie generally in the plane of the body of the spring element 420. In the standard position, the projections 450, 452, 454, 456 are out of engagement and thus electrical contact with any element. However, when the emergency four-way flash actuator 416 is pushed inwardly, the contacts 450, 452, 454, 456 engage rivet heads 338, 364, 374, 378 respectively. In this way, an electrical connection is made from the emergency four-way flasher element, through the rivet 438, through the ball 428 which has been moved into engagement with both the contact heads of rivets 436, 432, through the spring member 430 to each of the respective contact arms 450 to 456. As will be noted from the above description, the rivet head 338 is connected to the right rear light, the head 364 being connected to the right front light, the head 374 being connected to the left rear light and the head 378 being connected to the left front light. Thus, pulses of energy are directed to all of the lights of the vehicle to provide the emergency four-way flash mode of operation. As the four-way flash actuator 416 is moved rearwardly, the spring element 420 is also moved to the release contact between the light system and the four-way flasher.

Referring now to composite FIGS. 14 and 15, there are illustrated other methods for interconnecting the exterior wires to the turn signal assembly described and also to fasten certain connectors to the base element, for example the method for fastening spring elements 336 or 351 to the base element. Referring particularly, to FIG. 14, there is illustrated a portion of the base in cross-section with a connector passing through the base member 310 to an upper surface thereof. The portion of the base 310 illustrated includes a cavity 460 which is provided with a member to be fastened to the base, for example the strip element 370, which is adapted to rest within the aperture 460.

The connector 462 includes a main body portion 464 which is generally cylindrical and hollow and an upper and a lower end, both ends being identical. However, in assembling the unit, one end does not include a wrapped-over portion 464 to permit insertion of the connector through the hole in the base element 310. After the connector is positioned and the strip 370 is placed on the cylindrical portion, the upper end 468 is swaged over to preclude the connector 462 from pulling through the aperture and also precluding the slippage of terminal strip 370 from the shank of the connector 462. The hollow body portion 464 is adapted to receive a male plug member 470 which includes a projection 472 which is adapted to fight into the material of the cylindrical portion 464 to preclude the separation of the male member 470 from the cylindrical portion 464. The plug 470 is mounted on a housing 474 which may be utilized to enclose the wire harness.

Referring now to FIG. 15, there is illustrated the alternative to the embodiment illustrated in FIG. 14 wherein a male plug element 478 is adapted to be inserted into an aperture (not shown) in a member 480 mounted on the housing 474. The male member 478 again is utilized to fasten the strip conductor 370 to the base element 410 and also provide an electrical connection from an external device, such as a lamp, to the conductor 470. The plug member 478 includes a generally hollow cylindrical shank portion 484 which is inserted through an aperture 486 formed in the body member 310. The upper ends of the shank portion 474 are then swaged over from the dotted line position to the full line position thereby grasping the base member 310 and the strip contact 370 and precluding the relative movement therebetween and also precluding the shaft portion 484 from separating from the base member 310.

The male assembly 478 also includes a projection 486 which limits the movement of the shaft 484 into the base 310. The actual connection is made with a connector plug 488 which is fastened to the cylindrical portion 484. The assembly further includes a guard element 490 which limits the degree of insertion of plug member 488 into the aperture formed in the member 480.

Referring now to FIG. 16, there is illustrated a schematic diagram 500 of the system described above in FIGS. 10 to 13 where like elements had been given like reference numerals. Particularly, a connector 338, and thus the spring contact 336, are connected to the rear light by means of a conductor 502 and a connector 364 is connected to the front light by means of a conductor 504, the lights 506, 508 being grounded at the opposite terminals thereon. Similarly, the rear and front lamps 510, 512 are grounded at one terminal and the other terminal is connected to the rivets 374, 378 by means of conductors 514, 516 respectively. The brake switch is connected in circuit, particularly between the source of positive voltage and a common conductor 518 by means of a conductor 520. The common conductor 518 is connected to the terminals 350, 392 which are adapted to engage the spring elements 336, 370 respectively.

The flashers 522, 524 are also connected to the source of positive potential and to the turn signal switch assembly by means of conductors 526, 528 respectively. These conductors 526, 528 are connected to the terminals 438, 434 respectively.

In operation, when the handle is actuated clockwise to signal a right turn, the ball contact 366 engages the strip conductor 368 and the spring conductors 336, 351 simultaneously, as was described above. This places standard flasher energy from the standard flasher circuit 524 to the front and rear lamps by means of a circuit including conductor 528, terminal 434, ball contact 428, terminal 436, strip conductor 368, to the rear lamp through ball 336, strip conductor 336, and conductor 502, and to the front lamp through ball 366, strip conductor 351 and a conductor 504. Assume that the brake switch is then energized while a turn signal switch is indicating a right turn, brake energy will not flow to the rear light 506 because of the fact that the spring element 336 has been moved away from contact with the terminal 350. However, the rear lamp 510 will be energized due to the fact that strip element 370 is still in contact with terminal 392. Accordingly, turn signal information overrides the brake.

Now assuming that the four-way flash is then energized while the turn is being indicated, all four lamps will flash at the rate determined by the emergency flasher circuit 522 due to the connection made by the spring element 420 described in conjunction with FIG. 11, 12 and 13. However, if no turn is being indicated and the emergency four-way flash is actuated, all of the front and rear lamps will flash at the rate determined by the emergency flasher circuit 522 except in the case where the brake is energized. In this case, steady energy will be supplied to both rear lamps 506, 510 through conductor 518, terminals 350, 392, strip elements 336, 370 to the lamps 506, 510. This is due to the fact that the strips 336, 370 are in contact with terminals 350, 392 respectively.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. An automobile turn signal device including housing having a base, left turn signal switch, a right turn signal switch, both of said switches being disposed in said housing, and actuator means for said switches, the improvement comprising means forming a first and second arcuate slot portions supported by at least a portion of said base, each of said switches having first and second contact strips disposed in spaced relation in said slot and first and second contact balls adapted to be moved along said slot portion by the actuator and having neutral positions in which said contact balls are held out of engagement with at least one of said first and second strips, the actuator being movable in one direction from said neutral position to move the contact ball of one of said switches into engagement with both the contact strips of that switch and movable in another direction from said neutral position to move the contact ball of the other of said switches into engagement with the both contact strips of said other of said switch.

2. The improvement of claim 1 wherein said contact balls are out of engagement with both of said first and second contact strips in said neutral position.

3. The improvement of claim 1 wherein said arcuate slot portions form part of a continuous arcuate slot.

4. The improvement of claim 3 wherein the actuator has a pivot point on the base about which said actuator means is pivotable a pivot point, said continuous arcuate slot having a radius through said pivot point.

5. The improvement of claim 3 further including a third contact strip for each switch, said third contact strip being disposed in said slot portions, said actuator being movable in one direction to move the ball contact of one of said switches to simultaneously engage said first, second and third contact strips of that switch and movable in another direction from said neutral position to move the ball contact of the other of said switches to simultaneously engage said first, second and third contact strips of such other of said switches.

6. The improvement of claim 5 wherein said second contact strips have portions disposed adjacent each other, the device further including an emergency flasher switch mounted in said housing and comprising an emergency contact strip disposed adjacent said adjacent portions of said second contact strips, and an emergency ball contact.

7. The improvement of claim 6 further including an emergency flasher control member for moving said emergency ball contact and movable between an "off" position in which said emergency ball contact is disposed out of engagement with said adjacent portions of said second contact strips and an "on" position in which said emergency ball contact simultaneously engages said adjacent portions of said second contact strips and said emergency contact strip.

8. The improvement of claim 7 further including a brake switch mounted in said housing and comprising a brake contact strip disposed adjacent said adjacent portions of said second contact strips and a brake ball contact adapted to simultaneously engage said brake contact strip and said portions of said adjacent second contact strips and movable to a position out of contact with at least one of said adjacent portions.

9. The improvement of claim 8 further including abutment means on said actuator effective upon a predetermined movement of said actuator in either of said directions from said neutral position to engage said brake ball contact and move it out of engagement with one of said portions of said second contact strips.

10. A switch mechanism as defined in claim 7 including another switch operated by said emergency flasher control member for controlling the circuit to said left and right turn switches and comprising a pair of strip contacts mounted in said housing and an emergency ball contact carried by and movable with said emergency flasher control member and disposed when said member is in said "off" position in engagement with both contacts of said pair of strip contacts and disposed when said member is in said "on" position out of engagement with said pair of turn strip contact.

11. A switch mechanism as defined in claim 10 wherein said another switch also includes a second pair of strip contacts disposed adjacent a portion of said emergency strip contact and wherein said emergency ball contact when said member is in said "on" position is disposed in engagement with said portion of said emergency strip contact and in engagement with said second pair of strip contacts.

12. The improvement of claim 1 wherein said actuator means includes means continuously urging said actuator toward and yieldably holding it in said neutral position, said actuator being movable in both of said directions from said neutral position to a first position in which it may be held by the operator during lane changing to hold the contact ball of one of said turn signal switches in engagement with the contact strips thereof and to a second position beyond said first position and to which the actuator may be moved by the operator in preparation for a normal turn and in which said contact ball of one of said turn signal switches engages the contact strips thereof, and detent means for holding said actuator in said second position.

13. An automobile turn signal device as defined in claim 12 wherein said detent means are integrally formed in said contacts and engage one of said ball contacts when said actuator is in one of said second positions to yieldably hold said actuator against movement from said second position.

14. The improvement of claim 1 wherein said second contact strips of said turn switches have portions disposed adjacent each other, the signal device further including a brake contact strip mounted in said housing adjacent said portions of said second contact strips, a brake ball contact mounted in said housing and disposed in engagement with said portions of said second contact and in engagement with said brake strip contact strips when said actuator is in said neutral position, and abutment means on said actuator and effective upon a predetermined movement of said actuator in either of said directions to move said brake ball contact out of engagement with one of said portions of said second contact strips.

15. The improvement of claim 1 further including an emergency flasher switch disposed in said base and including an emergency contact strip and an emergency contact ball, said second contact strips of said turn signal switches having portions disposed adjacent each other and adjacent said emergency contact strip, and an emergency flasher control member controlling the position of said emergency contact ball and movable between an "off" position in which said emergency contact ball is disposed in spaced relation to said portions of said second contact strips and an "on" position in which said emergency contact ball engages said portions of said second contact strips and said emergency contact strip.

16. An automobile turn signal and emergency flasher device as defined in claim 15 wherein each of said turn signal switches includes a third strip contact which is engaged by the ball contact of the switch throughout the engagement of the ball contact with the first and second strip contacts of the switch.

17. An automobile turn signal and emergency flasher device as defined in claim 15 further including means continuously urging said actuator toward and yieldably holding it in said neutral position, said actuator being movable in opposite directions from said neutral position to a first position in which it may be held by the operator during lane changing to hold the contact ball of one of said turn signal switches in engagement with the contact strips thereof and to a second position beyond said first position and to which the actuator may be moved by the operator in preparation for a normal turn and in which said contact ball of one of said turn signal switches also engages the contact strips thereof.

18. The improvement of claim 17 further including detent means for holding said actuator in said second position.

19. An automobile turn signal and emergency flasher device as defined in claim 17 in which said housing has a slot in which said contact balls of said turn signal switches are moved by said actuator, said housing having a second slot extending transversely of said first named slot, said emergency contact ball being supported in said second slot and being moved by said emergency flasher control member.

20. The improvement of claim 1 wherein said first ball engages one of said first and second contact strips before it engages the other of said first and second contact strips to improve the life of said contacts.

21. The improvement of claim 1 further including a bank terminal element, wherein said turn signal device further includes a first and second terminal element electrically engaging one of said first and second contact strips of each of said switches, one of said first and second contact strips being in electrical engagement with said brake terminal element.

22. The improvement of claim 21 further including a brake signalling circuit having a brake switch actuated by a brake pedal to provide a brake signal, wherein said brake terminal element is provided with electrical energy upon energization of said brake signalling circuit, said brake terminal element providing brake signalling energy to said one of said first and second contact strips.

23. The improvement of claim 22 wherein the movement of said first and second contact balls into engagement with said one of said first and second contact strips displaces said one of said first and second contact strips out of engagement with said brake terminal element thereby electrically disconnecting said brake terminal element from said one of said first and second contact strips.

24. The improvement of claim 23 wherein the disengagement of said brake terminal element from said one of said first and second contact strips in response to movement of either said first and second contact balls in response to the signalling of a turn causes said turn signal to override said brake signal.

25. The improvement of claim 1 further including a third contact strip for each switch, said third contact strip being disposed in said slot portions, said actuator being movable in one direction to move the ball contact of one of said switches to simultaneously engage said first, second and third contact strips of that switch and movable in another direction from said neutral position to move the ball contact of the other of said switches to simultaneously engage said first, second and third contact strips of such other of said switches.

26. The improvement of claim 25 further including an emergency flasher switch mounted in said housing and comprising an emergency contact resilient web element disposed intermediate said one signal switch and said other signal switch and a third ball contact element in electrical engagement with said emergency contact element, said emergency contact element being adapted to be electrically connected to each of said first and second contact strips of both said switches.

27. The improvement of claim 26 further including a standard flasher contact and an emergency flasher contact, said third contact ball being electrically connected in engagement with said standard flasher contact and said third contact strip to provide standard pulses of electrical energy to said first and second contact balls during a left or right turn signal.

28. The improvement of claim 27 wherein said standard flasher contact and said emergency flasher contact are connected to separate flasher units.

29. The improvement of claim 27 wherein said emergency flasher contact is mounted on said housing adjacent said standard flasher contact and said third contact strip, said emergency flasher contact being electrically connected to a source of emergency flasher pulse source of energy, and means actuating said third contact ball into engagement with both said third contact strip and said emergency flasher terminal to provide flasher energy to said first and second contact strips of both said turn signal switches during the emergency flash mode of operation.

30. The improvement of claim 29 wherein said third contact ball is mechanically engaged by said contact web element movable therewith, said contact web element being moved during the emergency flash mode of operation thereby moving said third contact ball from engagement with said standard flasher terminal and said third contact strip into engagement with said emergency flasher terminal.

31. The improvement of claim 30 wherein said contact web element includes four arm elements electrically connected therewith and adapted to be engageable with a portion of both said switches for providing emergency flasher pulse energy to said first and second contact strips of said switches.

32. The improvement of claim 1 further including left vehicle lights, right vehicle lights, flasher means, circuit means interconnecting said left and right turn signal switches, said lights and said flasher means, module housing means forming one connection for said circuit means and connector means for interconnecting said module housing including said circuit means with said turn signal device including cooperable male plug means and female receptacle means, one of said plug means and receptacle means being mounted on said base for fastening at least certain of said contact strips to said base and the other of said plug means and receptacle means mounted on said module housing for readily detaching said housing from said base.

53. The improvement of claim 32 wherein said female receptacle includes a generally cylindrical hollow portion and a swaged-over portion at one end thereof engaging said base distant from said contact strip means and the other end having a swaged-over portion at least in contact with said contact strip.

34. The improvement of claim 32 wherein said male plug is mounted on said base and said female receptacle is mounted on said modular housing, said male plug including means formed thereon for clampingly engaging said base.

* * * * *